Nov. 11, 1952      A. S. CASWELL      2,617,862
GROUNDING DEVICE

Filed May 2, 1950      4 Sheets-Sheet 1

INVENTOR
ARTHUR S. CASWELL
BY
Ostrolenk & Faber
ATTORNEYS

Nov. 11, 1952 A. S. CASWELL 2,617,862
GROUNDING DEVICE
Filed May 2, 1950 4 Sheets-Sheet 2

INVENTOR
ARTHUR S. CASWELL
BY
Ostrolenk & Faber
ATTORNEYS

Nov. 11, 1952     A. S. CASWELL     2,617,862
GROUNDING DEVICE
Filed May 2, 1950     4 Sheets-Sheet 3
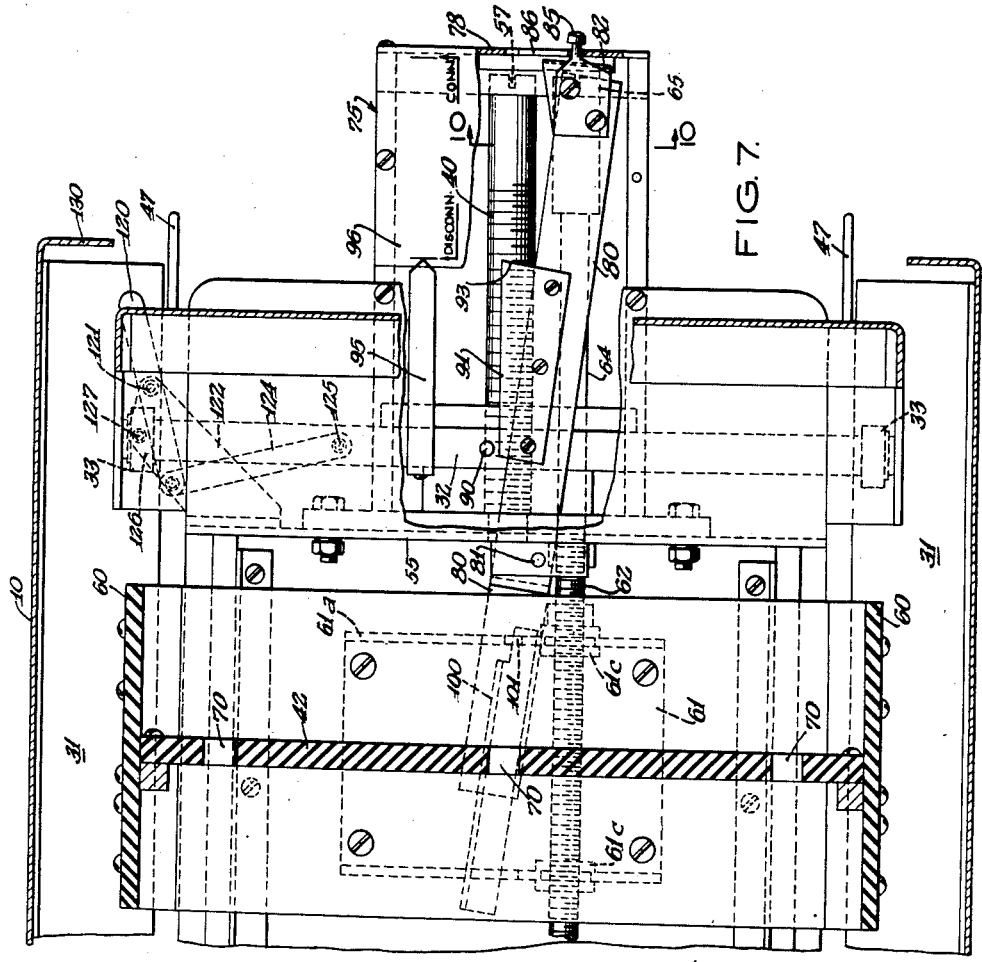
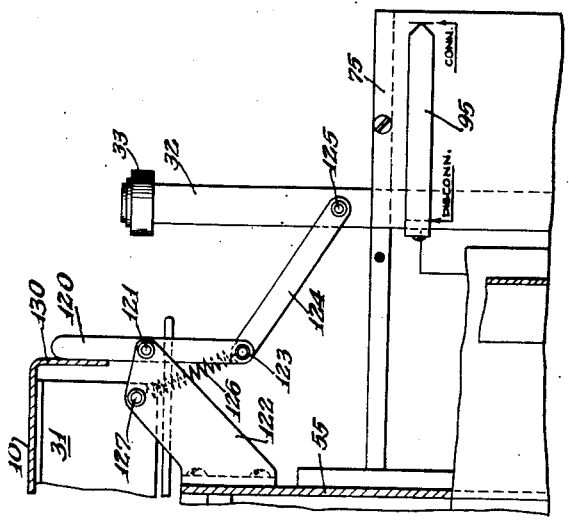
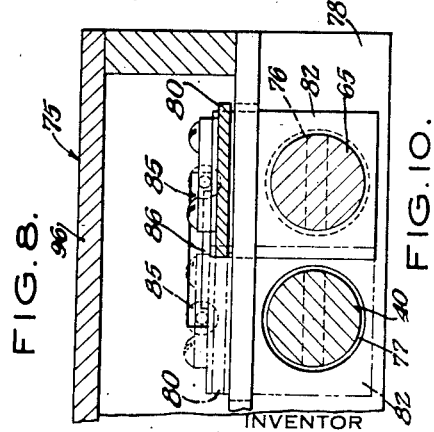
INVENTOR
ARTHUR S. CASWELL
BY
Ostrolenk & Faber
ATTORNEYS Nov. 11, 1952 — A. S. CASWELL — 2,617,862
GROUNDING DEVICE
Filed May 2, 1950 — 4 Sheets-Sheet 4

INVENTOR
ARTHUR S. CASWELL
BY
Ostrolenk & Faber
ATTORNEYS

Patented Nov. 11, 1952

2,617,862

UNITED STATES PATENT OFFICE 2,617,862

GROUNDING DEVICE

Arthur S. Caswell, Philadelphia, Pa., assignor to I-T-E Circuit Breaker Company, Philadelphia, Pa., a corporation of Pennsylvania Application May 2, 1950, Serial No. 159,598

4 Claims. (Cl. 175—298)

My invention relates to switchgear equipment in general and more specifically to a novel switchgear removable element designed for use in establishing ground potential on de-energized electrical power circuits and also for use in making check tests upon the switchgear bus and connected circuit equipment.

In any electrical power system it is frequently necessary to make repairs or alterations to the equipment connected to the circuit. The usual operation procedure in such a case always is to connect the electrical circuits of such equipment to ground potential, thereby establishing conditions such that contact with the electrical circuit will not be injurious either to personnel or to the equipment. Such precaution is necessary to prevent dangerous working conditions. The dangers of contact with energized circuits at high voltages will be removed. The dangers of contact with energized circuits after previously being de-energized will be decreased.

Therefore, one object of my invention is to design a device which will facilitate the grounding of any given electrical circuit within an enclosed type switchgear installation.

Another object of my invention is to provide a device for the safe grounding of the circuit by preventing any connections until the device is placed in the full operating position, after which the circuit may be tested with an indicator for possible existent potentials. Should the potentials be non-existent the circuit may then be safely grounded.

Another object is to provide a grounding device which may be used with the same ground clamp used for aerial lines and other elements of the system.

Since the advent of the enclosed type of switchboard installation, the instituting of various types of electrical tests upon the power circuits have been difficult due to the deliberately enforced unaccessibility of these power circuits.

Therefore, another object of my invention is the design of a device which would permit safe and rapid electrical connections to be made to the power circuit from points external to the switch board. The tests from these connections will include among others:

(1) Phase-to-phase and phase-to-ground potential magnitudes of energized circuit elements.

(2) Phase sequence and frequency of energized circuit elements. Also comparison of such sequence and frequencies.

(3) Resistance and impedance measurements of de-energized circuits.

Numerous other test possibilities may be recognized by those well-versed in the art.

The foregoing and many other objects of my invention will become apparent in the following description and drawings in which:

Figure 7 is a top plan view partly in section taken on line 7—7 of Figure 1 and showing the operating elements.

Figure 8 is a fragmentary enlarged view of a portion of Figure 7 showing the arrangement of the elements to prevent entry of the grounding device into the stationary structure when the elements of the grounding device are in the incorrect position.

Figure 10 is a cross-section on line 10—10 of Figure 7.

Figure 3:
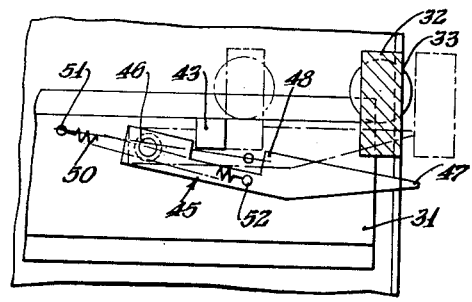
Figure 3 is a side view partly in section taken on line 3—3 of Figure 2 looking in the direction of the arrows.
Figure 2:
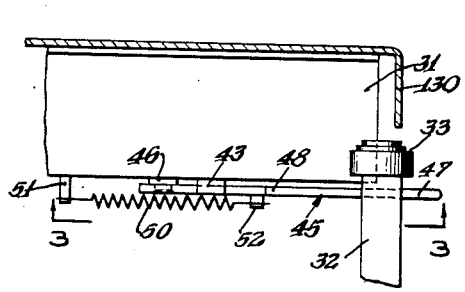
Figure 2 is a top detail view of the "racking-in" bar engagement with the stationary structure stop and latch.
Figure 1:
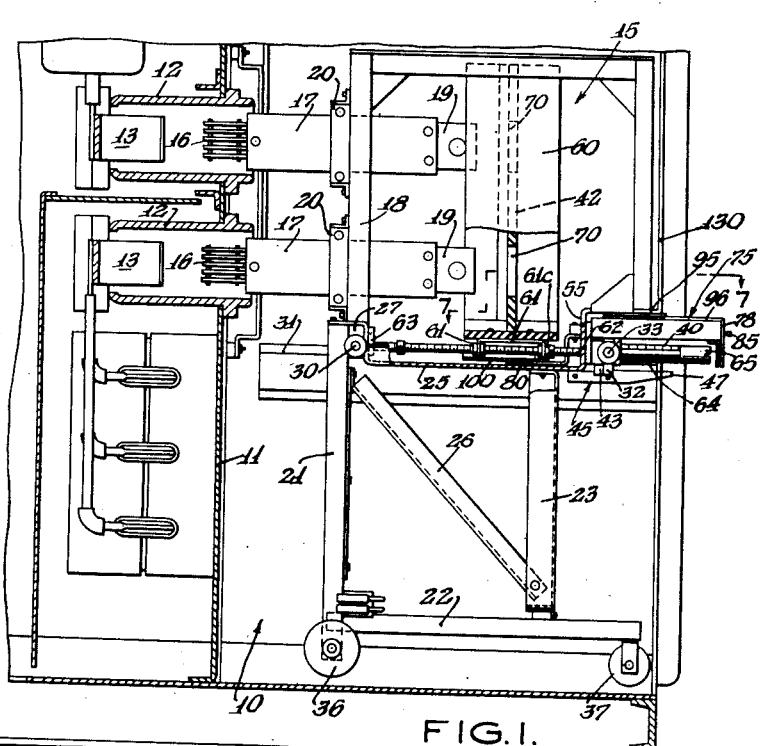
Figure 1 is a side view partly in cross-section of my novel grounding device showing the same introduced into the stationary structure and about to be racked into grounding position.
Figure 4:
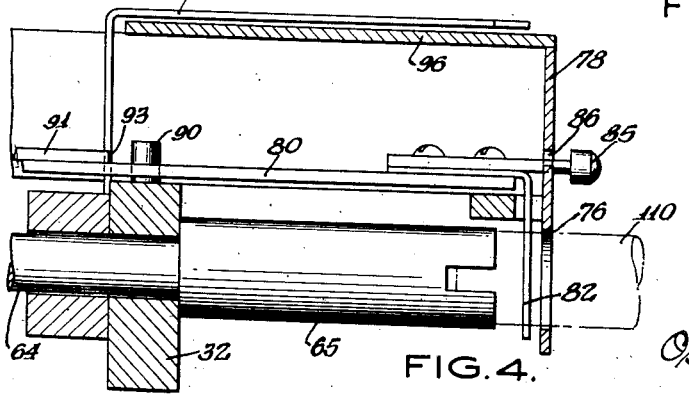
Figure 4 is a side view partly in section of the control knob for "racking-in" taken on line 4—4 of Figure 9 looking in the direction of the arrows.

Referring first to Figure 1, the circuit breaker stationary structure 10 has a rear wall 11 in which are positioned the insulating receptacles 12 for the stationary disconnect contacts 13, 13. Stationary structure 10 is normally designed to contain switchgear such as a circuit breaker having appropriate disconnect contacts (similar to those indicated by the disconnects 16, 16 shown on the grounding device 15) adapted to engage and make contact with the stationary disconnects 13.

When it is desired to work on the line or load circuits of contacts 13, then it is necessary, to protect the repairmen, to ground the circuit on which work is to be performed. This is accomplished by removing the related circuit breaker from the stationary structure 10 and introducing the grounding device 15 therein.

The grounding device 15 is provided with disconnect contacts 16, 16 on the ends of studs 17, 17 which pass through panel 18 and terminate in front panel connectors 19, 19. Studs 17, 17 are covered with insulating sleeves and are secured in panel 18 by clamps 20, 20 which are secured to studs 17 and to the panel 18. These pieces 20, 20 are metallic clamps (non-insulating). Insulation is furnished by the insulating covers of members 17. Panel 18 is essentially the rear wall of the grounding device 15; it is supported on the rear uprights 21 which in turn are rigidly connected to the lower horizontal bars 22.

Adjacent the front end, the lower bars 22 have secured thereto the upright channel members 23, the upper ends of which support the front area of the horizontal operating mechanism 25. The rear of horizontal mechanism 25 is supported by and secured to the upper ends of uprights 21. Uprights 21 are braced by diagonal brace members 26 secured between uprights 21 and 23 on each side.

An additional bracing channel 27 is secured across uprights 21 at their upper ends and carries at its ends at the side rear areas of the grounding device the guide wheels 30 adapted to ride on track 31 on the side of the stationary structure.

The front of operating panel 25 is re-entrantly bent and has mounted in front thereof the transverse racking bar 32, the ends of which carry front wheels 33 corresponding to the rear wheels 30 and also adapted to ride on track 31.

Base wheels 36 are provided at the rear of the grounding device and front center swivel wheel 37 is provided at the front as a support for the grounding device 15. Tracks 31 are downwardly chamfered at their forward ends so that as the grounding device 15 is pushed into the stationary structure 10 it is lifted by wheels 30 and 33 and off of wheels 36 and 37.

Panel 25 supports, horizontally thereon, two screw members; screw 40 (Figures 7 and 9) being provided for "racking-in" and screw 62 being provided for moving the isolating barrier 42 to the appropriate position after racking in of the grounding device and before racking the same out.

When the grounding device 15 is inserted into the stationary structure 10, the "racking bar" 32 moves against stops 43, 43 projecting on each side from the under side of track 31 into the path of "racking bar" 32. This predetermines the inmost position of the racking bar 32 in the stationary structure.

Thereafter, latch members 45 pivotally mounted at 46 in the stationary structure 10 are lifted by handles 47. The notch 48 in each latching member 45 engages the front of "racking bar" 32 and maintains the position of racking bar 32 in constant engagement relative to the stationary structure 10. Over-center springs 50 are connected between point 51 on the stationary structure 10 and point 52 on the latch members 45 to hold latch members 45 in either the latched or unlatched position.

The racking bar 32 is essentially a tapped member carrying the screw 40 in threaded engagement therewith, the screw 40 bearing against panel 55 of the operating panel 25 and being held therein for rotation but not having any longitudinal movement with respect thereto.

After the "racking bar" 32 is captured between stop 43 and notch 48 on each side, rotation of screw 40 by an appropriate tool 110 engaging operating end 57 (Figure 7) of screw 40 will move the screw longitudinally of "racking in" bar 32. Since racking bar 32 is held stationary by members 43—48, the rotation of screw 40 must move the grounding device 15 proper longitudinally, thereby moving the whole of the grounding device 15 from the position of Figure 1 to the position of Figure 5.

Figure 5:
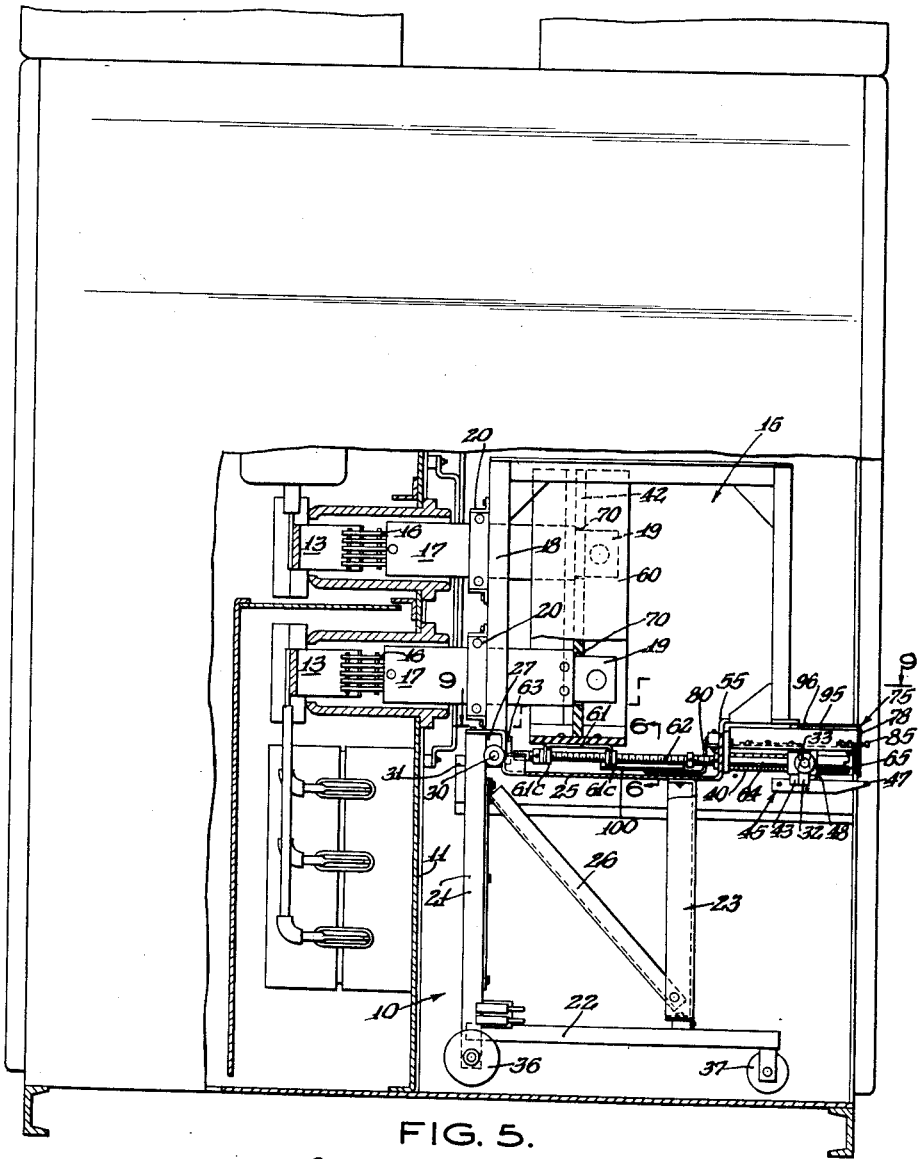
Figure 5 is a side view partly in section corresponding to the view of Figure 1 and showing the grounding device completely "racked-in."

When the screw 40 is rotated in the opposite direction, the racking bar 32 being held stationary, the grounding device 15 is drawn from the "racked-in" position of Figure 5 to the "racked-out" position of Figure 1 from where it may be withdrawn from the stationary structure.

The interlock members which ensure a proper and safe sequence of operation will be described after the individual operating elements have been shown.

Isolating barrier 42 is so arranged, as hereinafter described, that it can be moved to uncover the ground connectors 19, 19 only after the grounding device 15 is completely "racked-in"; and the grounding device 15 cannot be "racked-out" until the barrier 42 has been moved to cover once more the ground connectors 19, 19.

Barrier 42 has the peripheral flange 60 to the lower surface of which is secured the channel 61 having openings 61b in which are threaded nuts 61c engaging with the barrier shifting screw 62. Screw 62 is rotatably held but is not longitudinally movable in bearings 63 on platform 25 and has extension 64 terminating in operating end 65 which may be engaged by a tool to rotate screw 62.

After the grounding device 15 is racked in, screw 62 can be rotated to move the isolating barrier 42 from the position of Figure 1 where the ground connectors 19 are covered to the position of Figure 5 where ground connectors 19 pass through openings 70 in barrier 42 and are available for grounding or test connections. Before the grounding device 15 is "racked-out," the barrier 42 must be moved from the position of Figure 5 back to the position of Figure 1. This safety feature is provided for by the use of interlocking members described below.

An essential element of my invention is the arrangement of the screws 40 and 62 so that they are interlocked for their respective operations in proper sequence only; that is, the grounding device 15 cannot be "racked-in" while the barrier is in the rear position uncovering the members 19, 19a. The grounding device 15 can be moved in or out of the stationary structure only when barrier 42 is in its most fully front position.

An operating housing 75 (see Figure 7) is carried by front panel 55 of operating panel 25. Screws 40 and 62 extend into housing 75 where they terminate opposite openings 76, 77 in front wall 78 of the housing 75.

Figure 9:
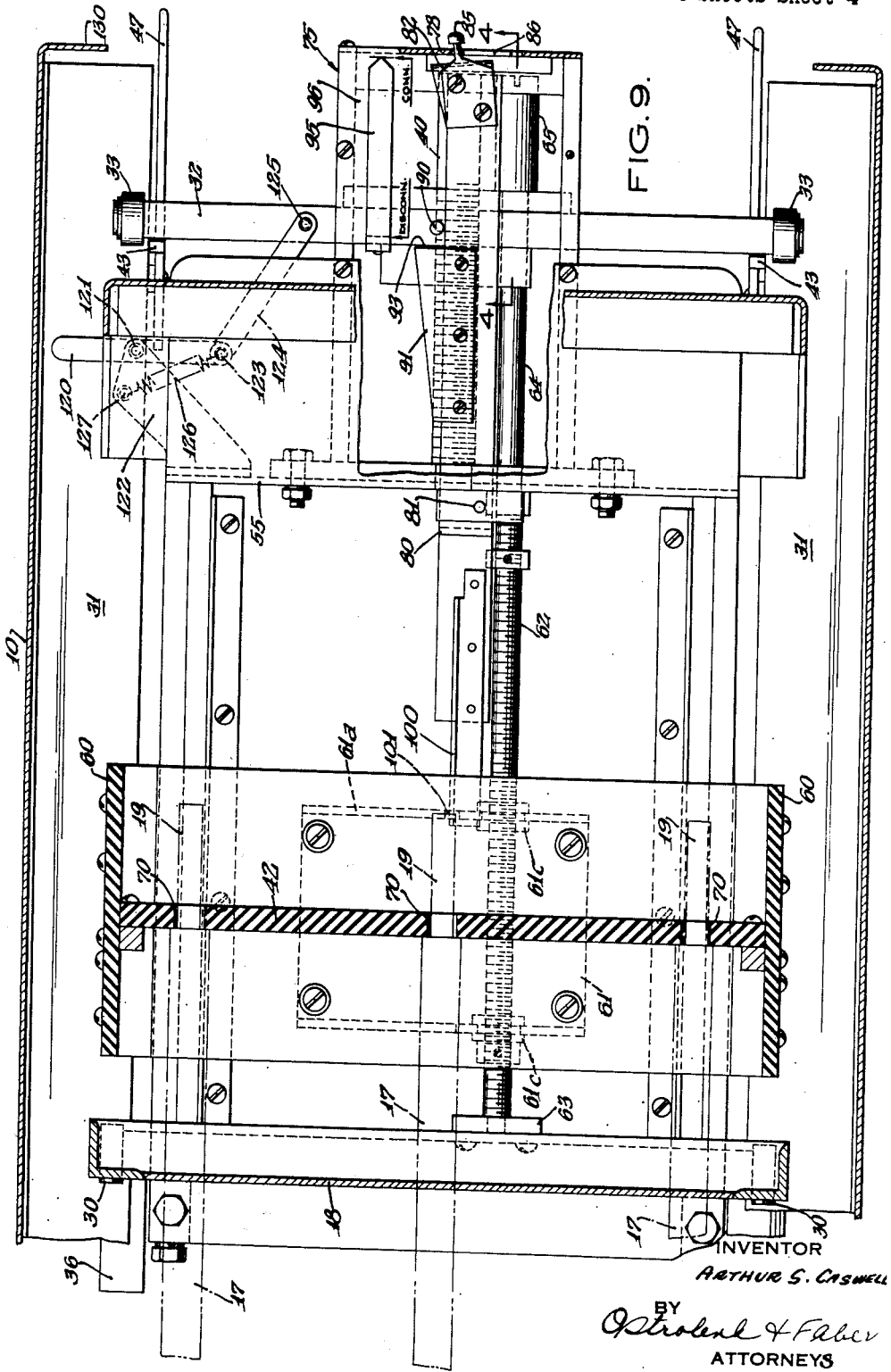
Figure 9 is a top plan view partly in section showing the grounding device racked in the structure in position for testing.

Interlock lever 80 is pivotally mounted on pin 81 of panel 25 for rotation in a horizontal plane. Lever 80 terminates in front blocking flange 82 which alternately covers opening 76 (Figure 7) or opening 77 (Figure 9). Lever 80 has the forwardly projecting knob 85 passing through slot 86 in front wall 78 above openings 76, 77 (see Figure 10).

In the position of Figures 1 and 7 the grounding device is "racked-out" and lever 80 is rotated to cover opening 76 and the end of screw 62. Screw 62 is, therefore, blocked by flange 82 and cannot be rotated.

Pin 90 on racking bar 32 engages the side piece 91 on lever 80 and prevents lever 80 from being rotated from the position of Figure 7 to the position of Figure 9. When the grounding device is fully "racked-in" to the position of Figure 9, then and only then is the pin 90 on racking bar 32 clear of side piece 91 past the recess 93. Then lever 80 may be rotated to the position of Figure 9 where opening 77 and screw 40 are covered by flange 82 and the end 65 of screw 62 for racking in the isolating barrier 42 is made accessible.

Racking bar 32 has the re-entrant indicator pointer 95 operating against indication plate (Figures 7 and 9) on top wall 96 of housing 75 to show the racked-in or racked-out position of the grounding device.

Figure 6:
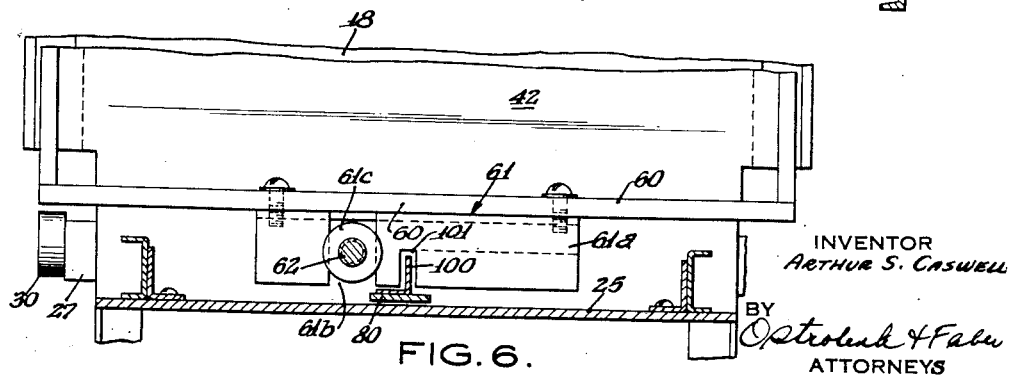
Figure 6 is a cross-sectional view taken on line 6—6 of Figure 5 looking in the direction of the arrows.

Lever 80 has at its inner end the longitudinal flange 100 riding in slot 101 (Figure 6) of flange 61a of channel member 61 which carries barrier 42.

Flange 100 terminates only at the forward point of lever 80 where flange 61a and barrier 42 reach the front or obstructing position of Figure 1. At this point, lever 80 may be rotated from the position of Figure 7 to the position of Figure 9. Thus, after the full "racking-in" operation, lever 80 may be moved to the position of Figure 9.

Upon the first operation of screw 62 by tool 110, barrier 42 is moved in and notch 101 in flange 61a engages flange 100 of lever 80 so that lever 80 may now no longer be rotated back to the position of Figure 7. The barrier 42 is moved by rotation of screw 62 to the position of Figure 5 where ground connectors 19 are uncovered. Lever 80 cannot at this position be rotated back to the position of Figure 7; hence no racking-out operation can occur.

If the grounding device 15 is to be racked-out, the barrier 42 must first be operated by rotation of screw 62 back to the outermost position before notch 101 can clear flange 100 and permit the lever 80 to be rotated to the position to permit racking-out.

As soon as racking-out begins by rotation of screw 40, pin 90 moves alongside side piece 91 of lever 80 and prevents movement of lever 80 back to the position of Figure 9 so that the barrier 42 cannot be moved in while the grounding device 15 is in the "racked-out" position or any position intermediate the "racked-in" and "racked-out" position.

Thus, the grounding device 15 must be racked in fully before the barrier can be moved in and the barrier must be moved out fully before the racking-out operation of the grounding device 15 can commence.

It is necessary to provide for means to prevent insertion of the grounding device into the stationary structure unless the grounding device is in a position with the barrier fully retracted toward the forward end.

For this purpose, blocking lever 120 is provided (compare Figures 7 and 9). Blocking lever 120 is pivotally mounted on pin 121 on bracket 122 carried by panel 55. The inner end of lever 120 is connected by pin 123 to link 124 connected by pin 125 to racking bar 32. Tension spring 126 is connected between pin 123 and pin 127 on bracket 122.

With the mechanism in the "racked-in" position, lever 120 is extended to a position where it engages flange 130 of the stationary structure 10. Hence, unless the grounding device is in the fully "racked-out" position of Figure 1, it cannot enter the stationary structure.

As the grounding device is "racked-out" to the position of Figure 7, movement of racking bar 32 with respect to panel 55 moves link 124 and lever 120 to a position where lever 120 is retracted to permit entry of the grounding device into the stationary structure and exit therefrom.

Consequently, in addition to the interlock lever 80 which ensures appropriate sequential operation of the elements for maximum safety, lever 120 ensures that the grounding device 15 can be inserted in stationary structure 10 only with all elements in the "racked-out" position so that an accidental ground connection cannot be made.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. A movable circuit contactor; a frame carrying the same; a plurality of disconnect contacts projecting beyond said frame; said disconnect contacts each being connected to a terminal member within the frame of the contactor; a barrier carried within the frame of the circuit contactor and extending in a plane substantially normal to the line of contact of said disconnect contacts; said barrier having a plurality of openings each aligned with a terminal member; said barrier being translatably movable in a direction normal to the line of contact of said disconnect contacts between a first position where it is fully withdrawn from the terminal members and a second position where the terminal members pass through said openings; means for moving said circuit contactor and means for moving said barrier; said circuit contactor moving means and said barrier moving means each comprising a screw extending parallel to the direction of movement; said screws being rotatable in the circuit contactor but stationary longitudinally with respect thereto; a nut on the barrier engaging one screw, and a nut on the circuit contactor engaging the other screw; said last-mentioned nut comprising a stop member longitudinally movable along the screw with respect to the circuit contactor to effect movement of the circuit contactor said screws extending toward one end of the frame; a blocking bar having a flange blocking one of said screws; said blocking bar and its flange being movable from blocking relation with one screw to blocking relation with the other screw in response to the position of the barrier and of the stop member.

2. A grounding device having a movable frame; a plurality of disconnect contacts extending horizontally and projecting therefrom; said disconnect contacts each being connected to a terminal member within the frame of the grounding device; a vertical barrier carried within the frame of the grounding device; said barrier having a plurality of openings each horizontally aligned with a terminal member; said barrier being translatably movable in a horizontal direction between a first position where it is fully withdrawn from the terminal members and a second position where the terminal members pass through said openings; means for moving said grounding device and means for moving said barrier; said grounding device moving means and said barrier moving means each comprising a screw extending parallel to the direction of movement; said screws being rotatable in the grounding device but stationary longitudinally with respect thereto; a nut on the barrier engaging one screw, and a nut on the grounding device engaging the other screw; said last-mentioned nut comprising a stop member longitudinally movable along the screw with respect to the grounding device to effect movement of the grounding device; said screws extending toward the front of the grounding device; a blocking bar having a flange blocking one of said screws; said blocking bar and its flange being movable from blocking relation with one screw to blocking relation with the other screw in response to the position of the barrier and of the stop member.

3. A grounding device having a movable frame; a plurality of disconnect contacts extending horizontally and projecting therefrom; said disconnect contacts each being connected to a terminal member within the frame of the grounding device; a vertical barrier carried within the frame of the grounding device; said barrier having a plurality of openings each horizontally aligned with a terminal member; said barrier being translatably movable in a horizontal direction between a first position where it is fully withdrawn from the terminal members and a second position where the terminal members pass through said openings; means for moving said grounding device and means for moving said barrier; said grounding device moving means and said barrier moving means each comprising a screw extending parallel to the direction of movement; said screws being rotatable in the grounding device but stationary longitudinally with respect thereto; a nut on the barrier engaging one screw, and a nut on the grounding device engaging the other screw; said last-mentioned nut comprising a stop member longitudinally movable along the screw with respect to the grounding device to effect movement of the grounding device; said screws extending toward the front of the grounding device; a blocking bar having a flange blocking one of said screws; said blocking bar and its flange being movable from blocking relation with one screw to blocking relation with the other screw in response to the position of the barrier and of the stop member; a lug on said blocking bar; a flange on said barrier; a slot in said flange; said lug engaging the side of said flange at all positions of said barrier except the position where the barrier is fully withdrawn from the terminals.

4. A grounding device having a movable frame; a plurality of disconnect contacts extending horizontally and projecting therefrom; said disconnect contacts each being connected to a terminal member within the frame of the grounding device; a vertical barrier carried within the frame of the grounding device; said barrier having a plurality of openings each horizontally aligned with a terminal member; said barrier being translatably movable in a horizontal direction between a first position where it is fully withdrawn from the terminal members and a second position where the terminal members pass through said openings; means for moving said grounding device and means for moving said barrier; said grounding device moving means and said barrier moving means each comprising a screw extending parallel to the direction of movement; said screws being rotatable in the grounding device but stationary longitudinally with respect thereto; a nut on the barrier engaging one screw, and a nut on the grounding device engaging the other screw; said last-mentioned nut comprising a stop member longitudinally movable along the screw with respect to the grounding device to effect movement of the grounding device; said screws extending toward the front of the grounding device; a blocking bar having a flange blocking one of said screws; said blocking bar and its flange being movable from blocking relation with one screw to blocking relation with the other screw in response to the position of the barrier and of the stop member; a lug on said blocking bar; a flange on said barrier; a slot in said flange; said lug engaging the side of said flange at all positions of said barrier except the position where the barrier is fully withdrawn from the terminals; a slot in said flange; said slot registering with said lug in the fully withdrawn position of the barrier.

ARTHUR S. CASWELL.

REFERENCES CITED

The following references are of record in the file of this patent:

UNITED STATES PATENTS

| Number | Name | Date |
|---|---|---|
| 1,609,925 | Wood | Dec. 7, 1926 |
| 1,954,583 | Caswell | Apr. 10, 1934 |
| 2,353,518 | Specht | July 11, 1944 |
| 2,358,146 | Clute | Sept. 12, 1944 |
| 2,504,775 | Wood | Apr. 18, 1950 |